(12) United States Patent
Burstein et al.

(10) Patent No.: US 9,018,912 B2
(45) Date of Patent: Apr. 28, 2015

(54) SYSTEM AND METHOD FOR MANAGING PARALLEL-CONNECTED BATTERY CELLS

(75) Inventors: Andrew J. Burstein, Pleasanton, CA (US); Lawrence Tse, Fremont, CA (US)

(73) Assignee: Inphi Corporation, Westlake Village, CA (US)

( * ) Notice: Subject to any disclaimer, the term of this patent is extended or adjusted under 35 U.S.C. 154(b) by 302 days.

(21) Appl. No.: 13/474,600

(22) Filed: May 17, 2012

(65) Prior Publication Data

US 2012/0293130 A1     Nov. 22, 2012

Related U.S. Application Data

(60) Provisional application No. 61/486,926, filed on May 17, 2011.

(51) Int. Cl.
    *H02J 7/00* (2006.01)
    *H02J 7/34* (2006.01)
(52) U.S. Cl.
    CPC *H02J 7/34* (2013.01); *H02J 7/0019* (2013.01)
(58) Field of Classification Search
    CPC ..... H02J 7/0014; H02J 7/0019; H02J 7/0026; H02J 7/00; H02J 7/0018; H02J 7/0024; H02J 7/0068; H02J 7/0054; H02J 7/007; H02J 2007/0049; H02J 3/28

USPC ......... 320/106–107, 112, 116–117, 126, 134, 320/136
    See application file for complete search history.

(56) References Cited

U.S. PATENT DOCUMENTS

| 7,598,706 B2 * | 10/2009 | Koski et al. | 320/117 |
| 2010/0213897 A1 | 8/2010 | Tse | 320/116 |
| 2012/0262121 A1 * | 10/2012 | Kuo et al. | 320/126 |

* cited by examiner

*Primary Examiner* — Nghia Doan
(74) *Attorney, Agent, or Firm* — Koppel, Patrick, Heybl & Philpott

(57) ABSTRACT

The present system and method manage a rechargeable battery comprising two or more battery cells or series stacks of cells. The system includes a set of switches, each of which connects a cell or stack of cells between positive and negative nodes when actuated, or connects one cell in a stack of cells to another cell in the stack when actuated, such that when all the switches in a given stack are actuated, it is connected between the positive and negative nodes. An electrical load is directly connected to the positive and negative nodes. A controller determines the state of each cell or stack of cells by measuring and/or calculating one or more predetermined characteristics, and selectively actuates the switches based on the states of the cells or stacks of cells so as to enhance the life of the battery.

17 Claims, 3 Drawing Sheets

SYSTEM AND METHOD FOR MANAGING PARALLEL-CONNECTED BATTERY CELLS

RELATED APPLICATIONS

This application claims the benefit of provisional patent application No. 61/486,926 to Lawrence Tse, filed May 17, 2011.

BACKGROUND OF THE INVENTION

1. Field of the Invention

This invention relates generally to batteries made from two or more battery cells connected in parallel, and more particularly to systems and methods for managing such batteries.

2. Description of the Related Art

With the growing requirements of high-energy battery-operated applications, the demand of multi-cell rechargeable battery packs (or simply "batteries") has been increasing drastically. Multiple cells are needed to serve the high capacity/energy requirements of certain battery applications, such as a laptop computer. Within a multi-cell battery pack, there may be multiple cells connected in series, as well as multiple cells connected in parallel. For example, a battery with four 3.6-volt cells connected in series may give a nominal voltage of 14.4V, with a capacity of 1000 milli-Amp-hours (mAh). 'N' groups of four series-connected 3.6-volt cells—each of which forms a "series stack of cells"—may then be connected in parallel to increase the battery's capacity from 1000 mAh to N*1000 mAh. At this time, popular multi-cell rechargeable batteries used in handheld appliances, computers, power tools, etc., are rather expensive and range from US$30 to US$300, depending on the number of cells and their respective capacities in the pack.

In use, rechargeable batteries are subject to many 'charge/discharge cycles', each of which consists of a battery charging operation which is intended to charge all cells up to their full capacity, followed by a period during which the cells lose their charge, through active use and/or inevitable leakage. One of the key challenges in charging/discharging multi-cell batteries is related to the non-uniformity of battery cells within the pack, due to, for example, manufacturing tolerances. For example, some 'weak' cells have a lower capacity than other cells, such that when fully charged, the weak capacity cell will provide less charge during operation than the other cells. A weak battery cell tends to limit the overall capacity of the entire battery. One way in which this problem is addressed is to use a special manufacturing process which involves binning and grouping cells based on their capacity properties, and then forming a battery pack using cells from the same bin. However, this extra step increases manufacturing cost. Moreover, mismatch between the cells increases after multiple charge/discharge cycles, which reduces the benefit of binning at the factory.

In addition, a battery pack that includes one or more series stacks of battery cells may no longer function if any given cell in a stack is severely degraded. In other words, the battery packs life time may be significantly degraded due to one single damaged cell. Even if cells are connected in parallel in a battery pack, different cells may lose different amounts of their capacity with each charge/discharge cycle. The entire pack may be unable to store its required charge even if only a few cells or a single cell lose a significant amount of capacity. Also, if only one cell fails by forming a short circuit, the entire pack is destroyed. Even though different cells may be able to withstand different numbers of charge/discharge cycles, they all must experience the same number of charge discharge cycles if they are tied together in parallel.

SUMMARY OF THE INVENTION

The present invention is directed to a system and method for managing parallel-connected battery cells which overcomes the problems noted above, providing a means of accommodating weak battery cells and extending battery lifetime.

The present system manages a rechargeable battery comprising two or more battery cells or series stacks of cells. The system includes:
  a set of switches adapted for connection to a battery comprising two or more battery cells or series stacks of cells, each of the switches arranged to:
    connect a respective one of the battery cells or stacks of cells between positive and negative nodes when actuated, or
    connect one cell in a series stack of cells to another of the cells in the series stack of cells when actuated, the system arranged such that when all of the switches in a given series stack are actuated, the series stack is connected between the positive and negative nodes;
  an electrical load directly connected to the positive and negative nodes; and
  a controller arranged to:
    determine the state of each battery cell or series stack of cells by measuring and/or calculating one or more predetermined characteristics of each cell or series stack of cells; and
    selectively actuate the switches based on the states of the battery cells or series stacks of cells so as to enhance the life of the battery.

The state of each battery cell or series stack of cells is determined by measuring and/or calculating characteristics of each cell or series stack of cells such as open circuit voltage, voltage across the cell under load, current provided by the cell under load, internal resistance of the cell, cell temperature, ambient temperature, cell aging rate, cell charge capacity, cell state-of-charge (SOC), and/or the number of charge cycles undergone by the cell.

The controller may use this data to attribute 'strength' values to each of battery cells or series stacks of cells based on their respective states. Each battery cell or series stack of cells is subject to complete or fractional charge/discharge cycles. The controller is preferably arranged to actuate the switches such that cells or series stacks of cells having higher strength values are subjected to more complete or fractional charge/discharge cycles than are cells or series stacks of cells having lower strength values. By selectively connecting or disconnecting individual cells or series stacks of cells in this way, overall battery lifetime may be enhanced.

These and other features, aspects, and advantages of the present invention will become better understood with reference to the following description and claims.

DETAILED DESCRIPTION OF THE INVENTION

A system in accordance with the present invention includes multiple rechargeable battery cells or series stacks of cells. The system also includes a set of switches. A switch may be arranged to connect a respective one of the battery cells or stacks of cells between positive and negative nodes when actuated. A switch may also be arranged to connect one cell in a series stack of cells to another of the cells in the series stack when actuated, such that when all of the switches in a given series stack are actuated, the series stack is connected between the positive and negative nodes. Note that, when so arranged, when all of the switches are actuated, all of the cells or series stacks of cells will be connected in parallel between the positive and negative nodes. Note that the system and method presented herein are equally useful with a battery comprising single cells that are parallel-connected (as in FIG. 1), or with a battery comprising series stacks of cells that are parallel-connected (as in FIG. 2). For clarity, the discussion below generally refers to single cells connected in parallel; however, it is understood that this language is also intended to encompass a configuration which uses series stacks.

Figure 1:
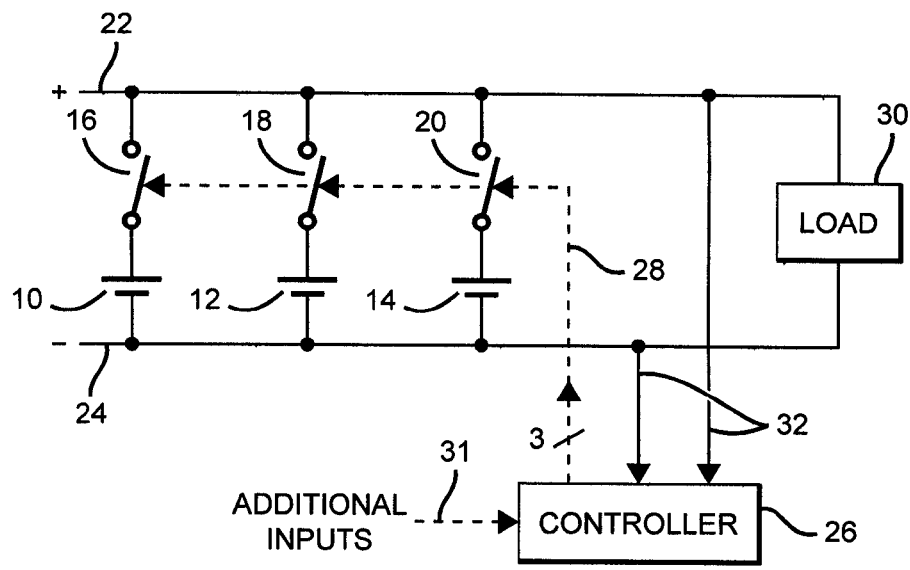
FIG. 1 is a block/schematic diagram of one possible embodiment of a parallel-connected battery cell management system in accordance with the present invention.

An exemplary embodiment is shown in FIG. 1. Here, the battery includes three single cells 10, 12 and 14, along with three switches 16, 18 and 20—each of which connects a respective battery cell between a positive node 22 and a negative node 24 when actuated. The system also includes a controller 26, which is arranged to determine the state of each battery cell by measuring and/or calculating one or more predetermined characteristics of each cell, and to selectively actuate the switches (16, 18, 20)—typically via respective control lines 28—based on the state of the battery cells (10, 12, 14) so as to enhance the life of the battery. A load 30 is directly connected to positive and negative nodes 22 and 24, and is thus powered by the battery.

Characteristics that might be used to determine the state of each battery cell or series stack of cells could include one or more of the following: open circuit voltage across the cell, voltage across the cell under load, current provided by the cell under load, internal resistance of the cell, temperature of the cell, ambient temperature, rate of aging of the cell, cell charge capacity, cell state-of-charge (SOC), and/or the number of charge cycles undergone by the cell. This list is merely exemplary; many other possible characteristics could be measured and/or calculated and taken into account when determining the state of the cell.

Cell SOC would be one particularly desirable characteristic to determine. It is important to highlight that the relationship between cell terminal voltage and SOC is a function of various parameters such as cell current and operating temperature. Cell SOC can be inferred by cell terminal voltage, with certain correction factors depending on various parameters such as cell current and temperature. Alternatively, SOC can be estimated using a combination of "coulomb counting" and other parameters such as those listed above; coulomb counting is performed by measuring the cell current and integrating with time. Having the ability to connect to each cell independently, the present system is well-suited to facilitate the determination of SOC for each cell.

The controller may be arranged to measure one or more of these characteristics by being connected to the positive and negative nodes (via lines 32, for example). Then, by actuating switch 16, for example, the controller is connected across cell 10 and can thus measure one or more of its characteristics. The characteristics of cells 12 and 14 can then be measured in similar fashion. Alternatively, the measurement of each cell's characteristics could be effected using individual lines (not shown) that are connected between each cell and controller 26. The circuitry needed to determine the state of each battery cell or series stack of cells may be contained within controller 26, may be implemented with circuitry separate from controller 26 which is linked to the controller via one or more additional input lines 31, or some combination of these. Based on one or more of these characteristics, the controller is arranged to connect or disconnect each cell from positive and negative nodes 16 and 18 as needed to enhance the life of the battery.

One way in which the controller can be arranged to interpret the measured and/or calculated characteristics is to assign a 'strength' value to each of battery cell based on its state, in accordance with a pre-determined algorithm; for example, the strength of a cell could be correlated to its SOC or rate of aging. In use, each battery cell is subject to complete or fractional charge/discharge cycles. When a strength value has been assigned to each cell, the controller actuates the switches (16, 18, 20) such that the cells having higher strength values are subjected to more complete or fractional charge/discharge cycles than are cells having lower strength values. By so doing, the battery lifetime is likely to be extended in comparison with a conventional system in which all parallel-connected cells are subject to an equal number of complete or fractional charge/discharge cycles.

The controller might be arranged to use the strengths of the cells such that 'weaker' cells—i.e., those having a strength value that is below a predetermined threshold—are connected between the positive and negative nodes only when 'stronger' cells—i.e., those having a strength value that is above the predetermined threshold—are at least partially discharged. This will result in stronger cells being subjected to more complete or fractional charge/discharge cycles than weaker cells, thereby extending the lifetime of the weaker cells and hence the lifetime of the battery as discussed above.

As noted above, the battery is connected to drive an electrical load 30, which is directly connected to positive and negative nodes 16 and 18. Another possible way in which the strengths of the cells might be employed is to arrange the controller such that cells having a strength value that is below a predetermined threshold are connected between the positive and negative nodes only when the load current is above a predetermined threshold. This is also likely to result in the stronger cells being subjected to more complete or fractional charge/discharge cycles than the weaker cells, which serves to extend the lifetime of the weaker cells and hence the lifetime of the battery as discussed above.

The controller 26 is arranged to selectively actuate the switches (16, 18, 20) based on the execution of an algorithm designed to enhance overall battery life, based on one or more cell characteristics as discussed above. The system is not limited to use with any specific algorithm; it is only necessary that the algorithm be designed to enhance overall battery life, based on one or more cell characteristics as discussed above. Different switching algorithms can be used to optimize different application scenarios and objectives.

Figure 2:
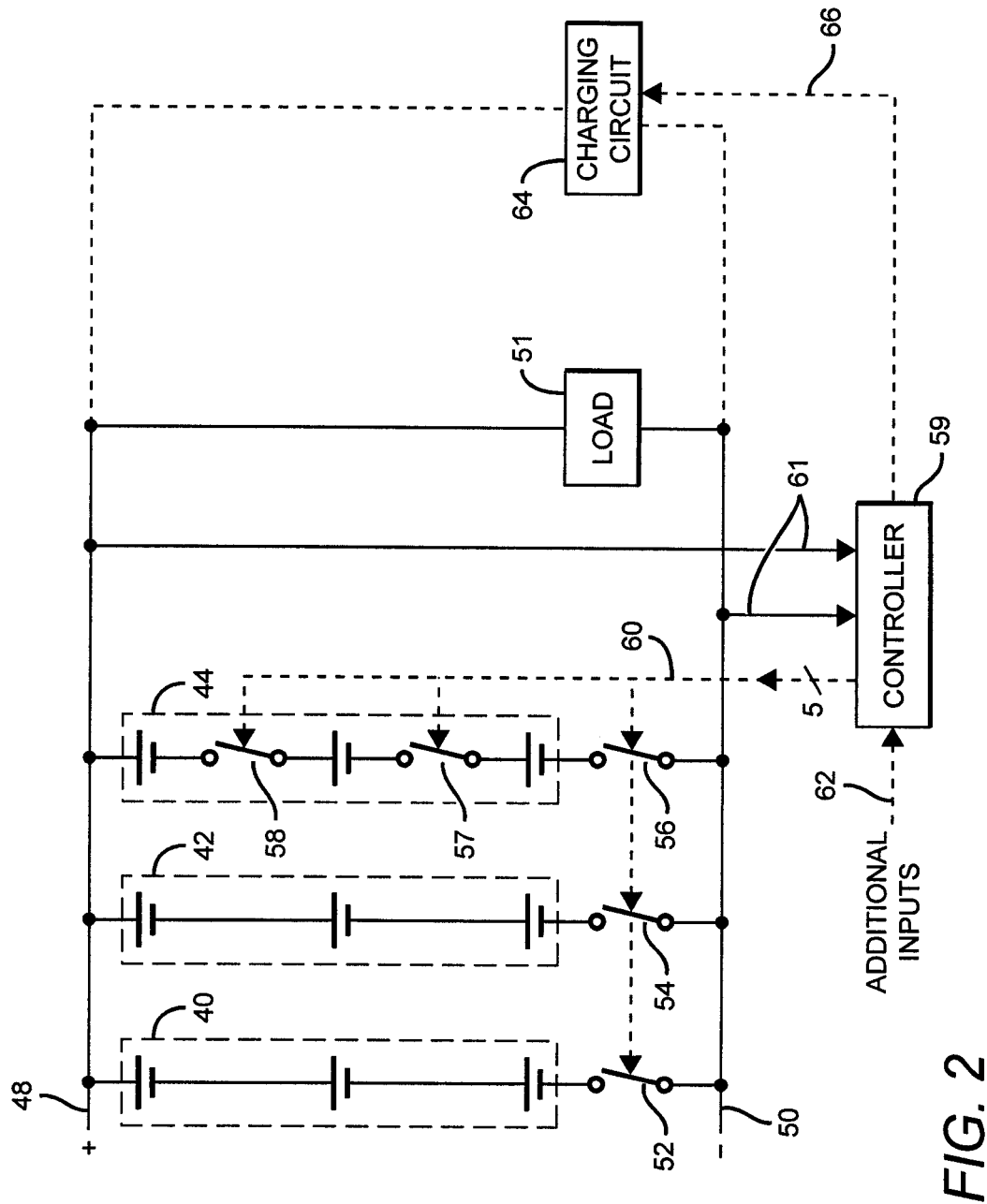
FIG. 2 is a block/schematic diagram of another possible embodiment of a parallel-connected battery cell management system in accordance with the present invention.

Several variations and additional features are illustrated in the schematic diagram shown in FIG. 2. As noted above, the present system can be used with a battery comprising single cells (as shown in FIG. 1) or series stacks of cells. The latter case is illustrated in FIG. 2, which includes three series stacks of cells 40, 42 and 44, all capable of being connected via switches between a positive node 48 and a negative node 50 and thereby driving a load 51.

Whereas in FIG. 1 switches 16, 18 and 20 were connected between cells 10, 12 and 14 and positive node 16, the switches can alternatively be connected between the cells or series stacks of cells and the negative node, or between individual cells in a series stack. Thus, in FIG. 2, switches 52, 54 and 56 are connected between cells 40, 42 and 44, respectively, and negative node 50. In addition, switches 57 and 58 are connected between individual cells of series stack 44. Thus, as required, when all of the switches (56, 57, 58) of stack 44 are actuated, the stack is connected between the positive and negative nodes; further, when all of the switches (52, 54, 56, 57, 58) are actuated, all of the series stacks (40, 42, 44) are connected in parallel between positive node 48 and negative node 50.

The switches are actuated by a controller 59 via respective control lines 60. As above, controller 59 is arranged to determine the state of each battery cell by measuring and/or calculating one or more predetermined characteristics of each cell (via lines 61 and using its own circuitry, or by receiving characteristic data via additional inputs 62), and to selectively actuate the switches (52, 54, 56, 57, 58) based on the state of the battery cells (40, 42, 44) so as to enhance the life of the battery.

The present battery cell management system would typically include a battery charging circuit 64 which may be coupled to the positive and negative nodes; battery charging circuit 64 might be contained within controller 59, or provided as a separate circuit 64 which is linked to controller 59 via one or more control lines 66. Controller 59 can then be arranged to actuate switches 52, 54, 56, 57 and 58 such that the cells or series stacks of cells are selectively connected to the battery charging circuit. This enables controller 59 to charge each cell or stack of cells independently, and thereby provide a custom charge level to each cell or stack of cells as desired. For example, as described above, controller 59 might be arranged to attribute a 'strength' value to each cell or series stack of cells based on its state, and to actuate switches 52, 54, 56, 57 and 58 such that cells or series stacks of cells having higher strength values are subjected to a higher final charging voltage than are cells or series stacks of cells having lower strength values.

Since the controller can connect to individual cells or series stacks of cells one at a time, the present battery cell management system enables individual battery cells or series stacks of cells to be calibrated. Calibration could be performed based on a schedule or measured conditions, with the controller actuating switches as needed to effect accurate calibration of individual cells. Here, accurate calibration is possible even if a user does not first do a deep discharge of the entire battery pack, since deep discharge of a single cell can be performed even if other cells making up the pack see a shallow discharge.

The frequency with which the state of the cells should be determined by the controller can depend on the particular application. For example, if the battery is used in a UPS unit, it would probably suffice to determine the state of the cells relatively rarely, whereas the cells of a battery used in a laptop would typically require more frequent assessment.

Figure 3:
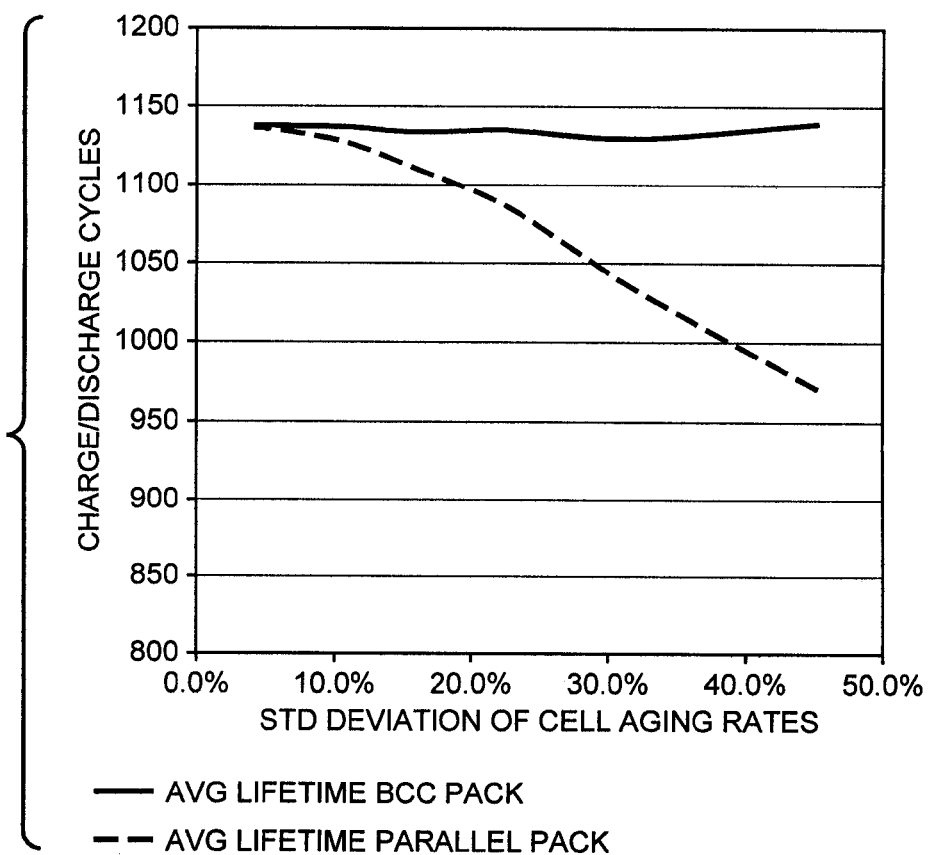
FIGS. 3 and 4 are graphs illustrating typical battery pack lifetimes with and without the use of the present invention.

FIG. 3 is a graph illustrating the effect of the present battery management system on pack lifetime for a typical 3-cell battery used in a tablet, by plotting standard deviation of cell aging rates versus number of charge/discharge cycles for both a conventional battery pack and a battery pack managed by the present system. By managing the cells as described herein, the standard deviation of cell aging rates remains relatively constant.

Figure 4:
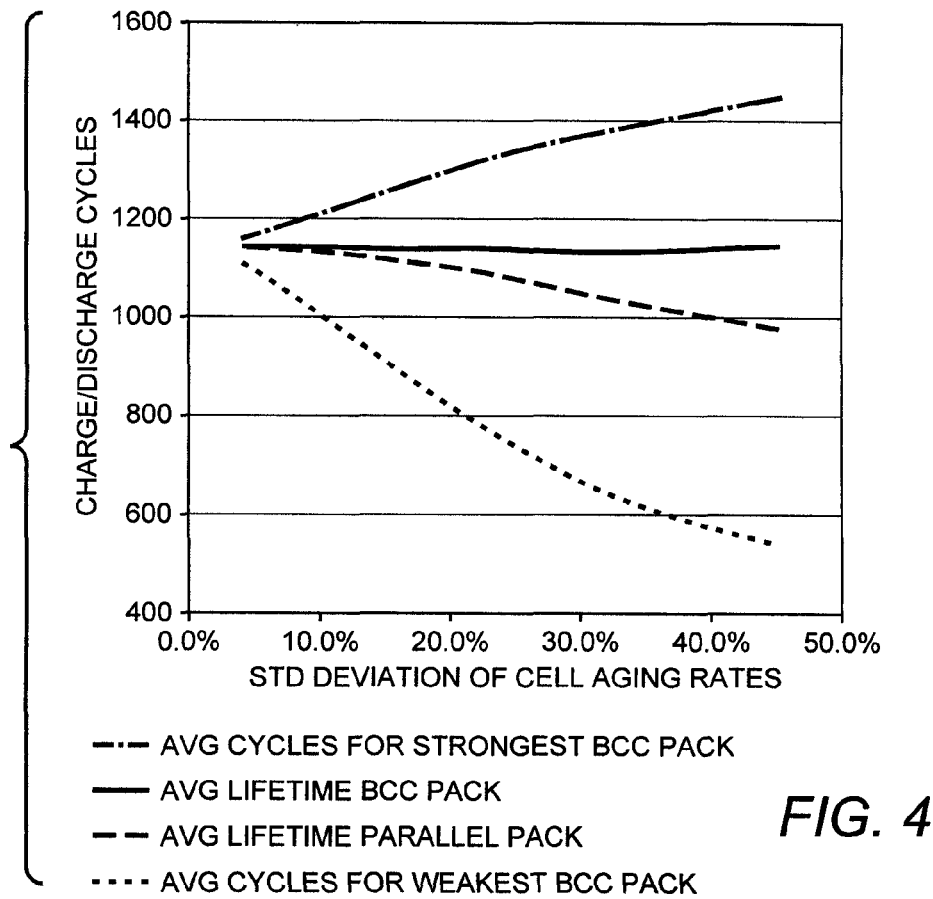

FIG. 4 is also a plot of standard deviation of cell aging rates versus number of charge/discharge cycles, which illustrates how the present battery management system extends pack lifetime by reducing the number of charge/discharge cycles for the weakest cells.

Figure 5:
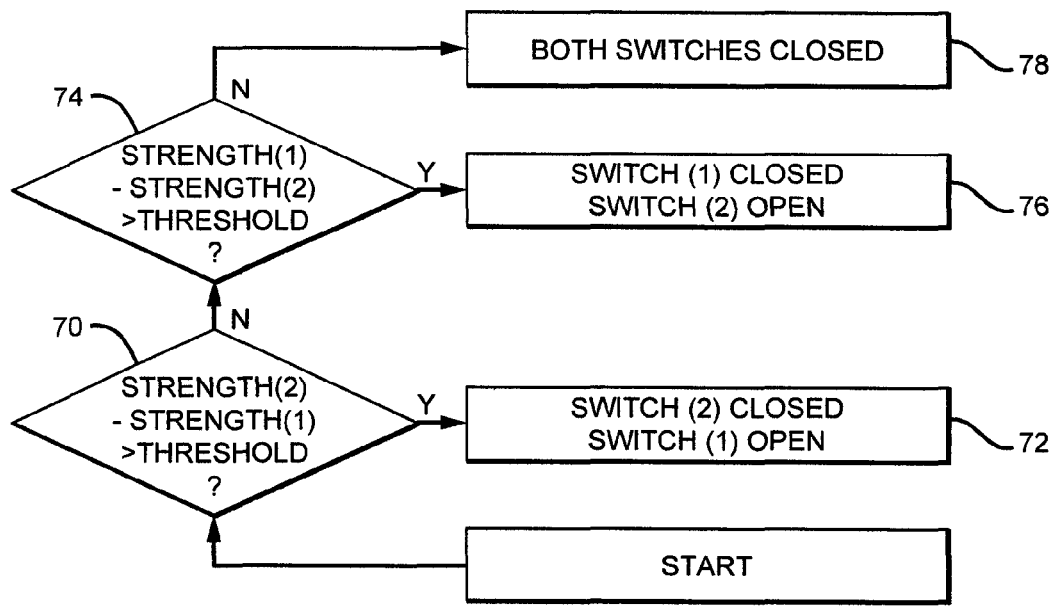
FIG. 5 is a diagram of one possible algorithm that might be used with a parallel-connected battery cell management system in accordance with the present invention.

As noted above, the controller is arranged to selectively actuate the switches based on the execution of an algorithm designed to enhance overall battery life. One basic example is shown in FIG. 5. Here, the algorithm is used with a system that includes first and second cells (cell(1), cell(2)), with the strength of each cell (Strength(1), Strength(2)) having already been determined. Each of the cells is connected in series with a respective switch (Switch(1), Switch(2)) which, when actuated, connects its cell between the positive and negative nodes.

In a first step (70), the controller determines whether Strength(2)−Strength(1) is greater than a pre-determined threshold. If it is, this indicates that cell(2) is stronger than cell(1), and thus Switch(2) is closed and Switch(1) is open (step 72) such that cell(2) is connected between the positive and negative nodes. If not, the controller determines whether Strength(1)−Strength(2) is greater than the pre-determined threshold (step 74). If it is, this indicates that cell(1) is stronger than cell(2), and thus Switch(1) is closed and Switch(2) is open (step 76) such that cell(1) is connected between the positive and negative nodes. If not, this indicates that the strengths of cell(2) and cell(1) are about equal, and thus both Switch(1) and Switch(2) are closed and both cell(1) and cell(2) are connected between the positive and negative nodes (step 78). As noted above, the algorithm shown in FIG. 5 is merely exemplary; many other possible algorithms could be used.

The embodiments of the invention described herein are exemplary and numerous modifications, variations and rearrangements can be readily envisioned to achieve substantially equivalent results, all of which are intended to be embraced within the spirit and scope of the invention as defined in the appended claims.

We claim:

1. A system for managing a rechargeable battery comprising two or more battery cells or series stacks of cells, comprising:

a set of switches adapted for connection to a battery comprising two or more battery cells or series stacks of cells, each of said switches arranged to connect a respective one of said battery cells or stacks of cells between positive and negative nodes when actuated, or to connect one cell in a series stack of cells to another of said cells in said series stack of cells when actuated, said system arranged such that when all of the switches in a given series stack are actuated, said series stack is connected between said positive and negative nodes;

an electrical load directly connected to said positive and negative nodes; and a controller arranged to:

determine the state of each of said battery cells or series stacks of cells based on one or more predetermined characteristics of each cell or series stack of cells; and selectively actuate said switches based on the states of said battery cells or series stacks of cells so as to enhance the life of said battery.

2. The system of claim 1, wherein said predetermined characteristics include one or more of the following: open circuit voltage across cell or series stack of cells, voltage across cell or series stack of cells under load, current provided by cell or series stack of cells under load, internal resistance of cell or series stack of cells, temperature of cell or series stack of cells, ambient temperature, rate of aging of cell or series stack of cells, cell or series stack of cells charge capacity, cell or series stack of cells state-of-charge (SOC), and/or number of charge cycles undergone by cell or series stack of cells.

3. The system of claim 1, wherein said controller is further arranged to attribute a strength value to each of said battery cells or series stacks of cells based on its state.

4. The system of claim 3, wherein each of said battery cells or series stacks of cells is subject to complete or fractional charge/discharge cycles, said controller arranged to actuate said switches such that cells or series stacks of cells having higher strength values are subjected to more complete or fractional charge/discharge cycles than are cells or series stacks of cells having lower strength values.

5. The system of claim 3, wherein said controller is arranged such that cells or series stacks of cells having a strength value that is below a predetermined threshold are connected between said positive and negative nodes only when cells or series stacks of cells having a strength value that is above said predetermined threshold are at least partially discharged.

6. The system of claim 3, wherein said electrical load conducts a current from said battery, said controller arranged such that cells or series stacks of cells having a strength value that is below a predetermined threshold are connected between said positive and negative nodes only when said load current is above a predetermined threshold.

7. The system of claim 1, further comprising an algorithm that is executed by said controller in order to determine which of said switches to selectively actuate.

8. The system of claim 1, further comprising a battery charging circuit arranged to be coupled to said positive and negative nodes, said controller arranged to actuate said switches such that said cells or series stacks of cells are selectively connected to said battery charging circuit.

9. The system of claim 8, wherein said controller is further arranged to attribute a strength value to each of said battery cells or series stacks of cells based on its state, said controller arranged to actuate said switches such that cells or series stacks of cells having higher strength values are subjected to a higher final charging voltage than are cells or series stacks of cells having lower strength values.

10. The system of claim 1, wherein said controller contains circuitry needed to determine the state of each of said battery cells or series stack of cells.

11. The system of claim 10, wherein said controller is arranged to measure and/or calculate one or more of said predetermined characteristics of each cell or series stack of cells.

12. The system of claim 1, further comprising a rechargeable battery comprising two or more battery cells or series stacks of cells to which said system is coupled.

13. A method of managing a rechargeable battery comprising two or more battery cells or series stacks of cells, comprising:
  for a battery which comprises two or more battery cells or series stacks of cells, determining the state of each of the battery cells or series stacks of cells by measuring and/or calculating one or more predetermined characteristics for each cell or series stacks of cells;
  based on the states of said cells or series stacks of cells and to enhance the life of said battery, actuating a set of switches to selectively connect said battery cells or series stacks of cells between positive and negative nodes and/or to connect one cell in a series stack of cells to another of said cells in said series stack of cells, said switches arranged such that when all of the switches in a given series stack are actuated, said series stack is connected between said positive and negative nodes; and
  directly connecting an electrical load between said positive and negative nodes.

14. The method of claim 13, wherein said step of determining the state of each of the battery cells or series stacks of cells comprises determining one or more of the following: open circuit voltage across cell or series stack of cells, voltage across cell or series stack of cells under load, current provided by cell or series stack of cells under load, internal resistance of cell or series stack of cells, temperature of cell or series stack of cells, ambient temperature, rate of aging of cell or series stack of cells, cell or series stack of cells charge capacity, cell or series stack of cells state-of-charge (SOC), number of charge cycles undergone by cell or series stack of cells.

15. The method of claim 13, further comprising attributing a strength value to each of said battery cells or series stacks of cells based on its state.

16. The method of claim 15, wherein each of said battery cells or series stacks of cells is subject to complete or fractional charge/discharge cycles, said step of actuating said switches to selectively connect said battery cells or series stacks of cells between said positive and negative nodes performed such that cells or series stacks of cells having higher strength values are subjected to more complete or fractional charge/discharge cycles than are cells or series stacks of cells having lower strength values.

17. The method of claim 13, further comprising coupling a charging current to said positive and negative nodes and actuating said switches so as to selectively connect said battery cells or series stacks of cells between said positive and negative nodes such that said battery cells or series stacks of cells are selectively charged by said charging current.

\* \* \* \* \*